United States Patent [19]

Naumovitz et al.

[11] Patent Number: 5,002,989

[45] Date of Patent: Mar. 26, 1991

[54] FORMULATION FOR EXTRUDABLE VINYLIDENE CHLORIDE COPOLYMERS HAVING HIGH BARRIER PROPERTIES

[75] Inventors: John A. Naumovitz; Steven R. Jenkins; Mark J. Hall; Stephen R. Betso, all of Midland, Mich.

[73] Assignee: The Dow Chemical Company, Midland, Mich.

[21] Appl. No.: 402,003

[22] Filed: Sep. 1, 1989

[51] Int. Cl.$^5$ .............................................. C08K 5/15
[52] U.S. Cl. .................................... 524/109; 524/417; 524/436; 524/487; 524/489; 524/568
[58] Field of Search ............... 525/227; 524/568, 417, 524/109, 436, 489, 487

[56] References Cited

U.S. PATENT DOCUMENTS

| | | | |
|---|---|---|---|
| 3,442,837 | 5/1969 | Brotz et al. | 525/239 |
| 4,132,691 | 1/1979 | Ejk | 524/436 |
| 4,203,880 | 5/1980 | Stoloff et al. | 524/568 |
| 4,303,564 | 12/1981 | Kuroshima et al. | 524/568 |
| 4,418,168 | 11/1983 | Johnson | 524/109 |

FOREIGN PATENT DOCUMENTS 63-63738  3/1988  Japan .

OTHER PUBLICATIONS

Wessling, R. A., *Polyvinylidene Chloride*, 174–76 (Gordon & Breach Sci. Publ. 1977).

*Primary Examiner*—Veronica P. Hoke

[57] ABSTRACT

The present invention is a formulated barrier composition containing tetrasodium pyrophosphate or magnesium hydroxide, high density polyethylene, epoxidzed vegetable oil, oxidized polyolefin and a paraffin or polyolefin wax. The composition has a substantially lower oxygen permeability than existing compositions and is at least equally extrudable.

61 Claims, No Drawings

FORMULATION FOR EXTRUDABLE VINYLIDENE CHLORIDE COPOLYMERS HAVING HIGH BARRIER PROPERTIES

BACKGROUND OF THE INVENTION

The present invention relates to the art of poly(vinylidene chloride) copolymers and formulations for the extrusion thereof.

Copolymers of vinylidene chloride and vinyl chloride or methyl acrylate are known to be useful as barrier polymers. Extruded and coextruded shaped articles, such as films, containing a barrier layer of copolymer having from 80 to 98 percent vinylidene chloride provide excellent barrier with respect to transportation of oxygen, water, carbon dioxide and flavoring for food, medical and other high barrier packaging. Vinylidene chloride copolymers and their uses are described in numerous references, such as R. A. Wessling, *Polyvinylidene Chloride* (Gordon & Breach Sci. Pub. 1977) and 23 Ency. Chem. Tech., *Vinylidene Chloride and Poly(Vinylidene Chloride)*, 764 (J. Wiley & Sons 1983), which are incorporated herein by reference.

Vinylidene chloride copolymers are susceptible to thermal degradation during extrusion. That degradation causes specks of carbonaceous material to appear in the extruded product. The level of carbonaceous material ordinarily increases at higher extrusion rates, which produce higher temperatures in the polymer. Carbonaceous material is unsightly and may cause the customer of the extruded product to reject the product. A variety of additives have been added to vinylidene chloride copolymers to help control thermal degradation and permit extrusion at higher rates. See, e.g., R. A. Wessling, *Polyvinylidene Chloride* at 174–76, and Johnson, Process for *Imparting Stability to Particulate Vinylidene Chloride Polymer Resins*, U.S. Pat. No. 4,418,168 (Nov. 29, 1983), which are incorporated herein by reference. For instance, some commercially available vinylidene chloride copolymer resins contain stabilizing amounts of tetrasodium pyrophosphate and epoxidized soybean oil. Resins containing those additives have been shown to provide containers having a barrier to oxygen of about 0.065 to about 0.15 Dow Units, with an average of about 0.10 Dow Units. One Dow Unit (D.U.) equals $$\frac{(1 \text{ cm}^3 \text{ of } O_2 \text{ at } S.T.P.)(1 \text{ mil thickness } PVDC)}{(100 \text{ in.}^2 \text{ area})(1 \text{ atm. pressure})(24 \text{ hr.})}$$

Vinylidene chloride copolymer compositions having higher barrier properties and equal or better extrudability would be more economical than current resins, because equivalent barrier could be obtained in extruded or coextruded products using a lesser amount of barrier resin. What are needed are extrudable and coextrudable vinylidene chloride copolymer compositions which provide improved barrier properties.

SUMMARY OF THE INVENTION

One aspect of the present invention is a formulated barrier composition in powder form comprising:
1. a copolymer of vinylidene chloride and a comonomer chosen from the group consisting of:
   (a) 10 to 20 weight percent vinyl chloride:
   (b) 4 to 10 weight percent alkyl acrylate; or
   (c) a mixture of those comonomers: and
2. a mixture of additives having the following weight concentration per hundred parts of vinylidene chloride copolymer:
   (a) an amount of inorganic stabilizer no greater than about 1.1 parts which is effective to stabilize the formulated barrier composition;
   (b) 0.45 to 1.05 parts high density polyethylene;
   (c) 0.8 to 1.0 part epoxidized vegetable oil;
   (d) 0.05 to 0.25 part oxidized polyolefin; and
   (e) 0.20 to 0.55 part paraffin or polyethylene wax.

A second aspect of the present invention is an additive composition comprising, in the following weight ratios:
   (a) an amount of inorganic stabilizer no greater than about 1.1 parts which is effective to stabilize a formulated barrier composition containing primarily vinylidene chloride-containing copolymer;
   (b) 0.45 to 1.05 parts high density polyethylene;
   (c) up to 1.0 part epoxidized vegetable oil, chosen such that the total concentration when added to a vinylidene chloride copolymer containing one of those compound will be 0.8 to 1.0 part epoxidized vegetable oil:
   (d) 0.05 to 0.25 part oxidized polyolefin; and
   (e) 0.2 to 0.55 part paraffin or polyethylene wax.

A third aspect of the present invention is a multi-layer article containing a barrier layer which comprises the product of a formulated barrier composition of the present invention.

Additive compositions of the present invention can be used to make formulated barrier compositions of the present invention. The formulated barrier compositions provide an extruded or coextruded article having a barrier superior to the barrier of existing extruded and coextruded vinylidene chloride products.

DETAILED DESCRIPTION OF THE INVENTION

Formulated barrier compositions of the present invention comprise a vinylidene chloride copolymer, an inorganic stabilizer, high density polyethylene (HDPE), epoxidized vegetable oil, oxidized polyolefin and paraffin or polyethylene wax. The major component is vinylidene chloride copolymer. The minor components are in an amount suitable to provide a composition which has good extrudability and has high barrier with respect to oxygen and other permeants.

Vinylidene chloride copolymers suitable for use in the present invention are those vinylidene chloride copolymers formed from a monomer mixture of vinylidene chloride monomer and a comonomer which is vinyl chloride or an alkyl acrylate. The alkyl acrylates are generally selected to have from about 1 to about 8 carbon atoms per alkyl group. Preferably, alkyl acrylates are selected to have from about 1 to about 4 carbon atoms per alkyl group. The alkyl acrylate is more preferably ethyl or methyl acrylate. The comonomer is most preferably methyl acrylate. Of course, vinylidene chloride copolymers useful in formulated barrier compositions may also contain small amounts (usually less than about 1 to 2 percent) of other ethylenically-unsaturated monomers which do not substantially reduce the extrudability or increase the permeability of the copolymer.

The amount of vinyl chloride or alkyl acrylate comonomer in the copolymer is low enough to preserve the semicrystalline character of the copolymer and high enough to provide a commercially extrudable polymer.

By "semicrystalline character" it is meant that the copolymer has between about 5 percent and about 95 percent crystallinity. Crystallinity values depend upon the measuring technique, and as used herein crystallinity is defined by the commonly used density method. See, for example, the discussion by R. Wessling, in Chapter 6 of *Polyvinylidene Chloride*. Vol. 5, Gordon and Breach Science Publishers, New York, 1977, the teachings of which are incorporated herein by reference. Vinyl chloride comonomer is preferably at least about 10 percent and more preferably at least about 12 percent of the copolymer: it is preferably at most about 20 percent and more preferably at most about 17 percent of the copolymer. Methyl acrylate comonomer is preferably at least about 4 percent and most preferably at least about 6 percent of the resulting copolymer; it is preferably at most about 8 percent and more preferably at most about 6 percent of the resulting copolymer. The vinylidene chloride copolymer is most preferably a 6 percent methyl acrylate copolymer.

Vinylidene chloride copolymers are known and are commercially available. Methods to synthesize them, such as by an emulsion or suspension polymerization process, are also familiar to persons of ordinary skill in the art. The copolymers and processes to synthesize them are described in U.S. Pat. Nos. 2,558,728; 3,007,903; 3,642,743; and 3,879,359; in R. A. Wessling, *Polyvinylidene Chloride*, supra. at 21–33 and 44–53; in 23 Ency. Poly Sci, supra, at 783–87; and in Yen et al., *Barrier Resins*. Report No. 179 of SRI International Process Economics Program 55–106 (February 1986); all of which are incorporated herein by reference. Typically, the monomeric materials are emulsified or suspended in an aqueous phase. The aqueous phase contains a polymerization initiator and a surface active agent capable of emulsifying or suspending the monomeric materials in the aqueous phase. The polymerization of the monomeric materials is usually carried out with heating and agitation. After polymerization is complete, the resulting suspension or emulsion slurry of vinylidene chloride copolymer has a majority of an aqueous phase. The resultant slurry is vacuum stripped. Thereafter, the slurry is cooled down, unloaded and dewatered, and the resin is collected and further dried.

The vinylidene chloride copolymer and the formulated barrier composition are in powder form prior to extrusion. The vinylidene chloride copolymer preferably has an average particle size no larger than about 300 microns diameter and no smaller than about 100 microns diameter. It preferably contains not more than about 5 percent particles having a particle diameter greater than 425 microns.

The additives used in compositions of the present invention may be individually added and blended with the vinylidene chloride copolymer; or may be blended concurrently with the vinylidene chloride copolymer, such as by physically blending the vinylidene chloride copolymer with an additive composition which has been separately prepared. Such additive compositions make up the second aspect of the present invention. They comprise the same additives as the polymer compositions described herein. The additives will ordinarily be in about the same weight ratios with respect to each other as are found in the formulated barrier composition. However, the inorganic stabilizer and/or the epoxidized vegetable oil may be in a lesser proportion to make up for quantities of those additives already found in the base resin.

Additives should be blended with the vinylidene chloride copolymer to form a formulated barrier composition of the present invention before extrusion or melt-phase processing of the vinylidene chloride copolymer. The additives are blended with the vinylidene chloride copolymer by any method which is effective to achieve substantially homogeneous dispersion of the additives without unduly heating the resin. Blending of the vinylidene chloride copolymer and the formulation package can be accomplished by conventional dry blending techniques. It preferably uses high intensity blending. Suitable dry blending equipment includes Hobart mixers, Welex mixers, Henschel High Intensity mixers, and the like.

Compositions of the present invention contain an inorganic stabilizer. The inorganic stabilizer is preferably tetrasodium pyrophosphate (TSPP) or magnesium hydroxide ($Mg(OH)_2$) or an equivalent thereof. Examples of other suitable inorganic stabilizers may include magnesium oxide, calcium hydroxide, and potassium pyrophosphate, and other inorganic stabilizers disclosed in Johnson, *Process for Imparting Stability to Particulate Vinylidene Chloride Polymer Resins*, U.S. Pat. No. 4,418,168 (Nov. 29, 1983), which is incorporated herein by reference. Inorganic stabilizers are known compounds which are commercially available. Both TSPP and $Mg(OH)_2$ can be synthesized by known processes, such as those described in *The Merck Index*, 10th Edition, (1983), which is hereby incorporated by reference. The composition preferably comprises TSPP.

The inorganic stabilizer preferably has an average particle diameter no larger than the average particle diameter of the vinylidene chloride copolymer. Persons skilled in the art will recognize that the effectiveness of the inorganic stabilizer is generally related to the surface area of the stabilizer employed. For purposes of this invention, the TSPP or $Mg(OH)_2$ beneficially has an average particle diameter of from about 1 to about 50 microns. One skilled in the art, without undue experimentation, will be able to determine the optimum particle size for specific additives.

The concentration of inorganic stabilizer is no more than about 1.1 parts per hundred (resin), and preferably no more than about 1.0 part per hundred (resin). (For the purposes of this Application, the term "parts per hundred (resin)" shall mean parts of additive per 100 parts of vinylidene chloride copolymer, by weight.) The specific weight ratios for optimum performance vary with different stabilizers. The concentration of TSPP in the formulated barrier composition is more preferably between 0.7 and 0.9 part per hundred (resin). Its concentration is most preferably about 0.8 part per hundred (resin). The concentration of $Mg(OH)_2$ is preferably between 0.6 and 0.7 part per hundred (resin), and is most preferably about 0.65 part per hundred (resin).

Formulated barrier compositions of the present invention also comprise high density polyethylene. The high density polyethylene may contain a minor amount of oxygen. These oxygen-containing polyolefins are formed by copolymerization of ethylene with some other comonomer, which may contain oxygen. For the purpose of this invention, a "minor amount" of oxygen means that the polyolefin may contain oxygen below an amount that will significantly change the properties from that of the homopolymer. High density polyethylenes are ordinarily substantially linear and preferably have a weight-average molecular weight of at least about 40,000. High density polyethylene, its properties and its synthesis are described in 16 Kirk-Othmer Ency. Chem. Tech. - 3rd Ed., *Linear (High Density) Polyethylene and Olefin Polymers (Ziegler Polyethylene)*, at 421-51 (J. Wiley & Sons 1980), which is incorporated herein by reference.

The concentration of high density polyethylene in the formulated barrier composition is at least about 0.45 part per hundred (resin), preferably at least about 0.5 part per hundred (resin) and more preferably at least about 0.9 part per hundred (resin). It is at most about 1.05 parts per hundred (resin) and preferably at most about 1.0 part per hundred (resin).

The formulated barrier compositions of the present invention also contain epoxidized vegetable oils, such as epoxidized soybean oil and epoxidized linseed oil. The epoxidized oil should be of a type suitable to act as a plasticizer for the copolymer. The epoxidized oil is most preferably epoxidized soybean oil. Epoxidized vegetable oils are known and are commercially available compounds. They and processes to synthesize them are described in 9 Kirk-Othmer Ency. Chem. Tech. - 3rd Ed., *Epoxidation*, at 251-63 (J. Wiley & Sons 1980), which is incorporated herein by reference. The concentration of epoxidized vegetable oil in the formulated barrier composition is at least 0.8 parts per hundred (resin) and at most 1.0 part per hundred (resin). It is preferably about 0.9 part per hundred (resin).

The compositions of the present invention also contain oxidized polyolefins, which are low molecular weight polymers which have a number average molecular weight of less than about 5,000, as determined by vapor phase osmometry. Preferably the number average molecular weight is about 1,000 to about 4,000, and most preferably between about 1,500 and about 2,500. The polyolefins have preferably been oxidized to an acid number of about 10 to 35, more preferably 13 to 17. These oxidized polyolefins preferably have a softening point, as determined by ASTM E-28 of about 85° C. to 145° C., more preferably 95° C. to 140° C., and most preferably 98° C. to 115° C. Generally, such oxidized polyolefins have a Brookfield viscosity at 140° C of about 120 to 300 centipoise (cps), and preferably 170 to 250 cps. Exemplary oxidized polyolefins including oxidized polyethylene, oxidized polypropylene, or mixtures thereof are employed. Oxidized polyethylene is preferred.

Oxidized polyethylene and oxidized polypropylene are known polymers which are commercially available, for instance under the trademark Allied 629A from Allied-Signal Corp. They can be prepared by reacting an ethylene homopolymer or copolymer with oxygen or an organic peroxide or hydroperoxide. The processes for synthesizing them are described in 16 Kirk-Othmer Ency. Chem. Tech. - 3rd Ed. *Olefin Polymers (High Pressure Polyethylene)*, at 412 (J. Wiley & Sons 1980) and 24 Kirk-Othmer Ency. Chem. Tech. - 3rd Ed. *Waxes*, at 477 (J. Wiley & Sons 1980), which are incorporated herein by reference.

The concentration of oxidized polyolefin in the formulated barrier compositions of the present invention is at least about 0.05 part per hundred (resin), preferably at least about 0.1 part per hundred (resin), and more preferably at least about 0.2 part per hundred (resin). The concentration is at most about 0.25 part per hundred (resin) and preferably at most about 0.2 part per hundred (resin).

Compositions of the present invention also contain a paraffin or polyethylene wax. They most preferably comprise a polyethylene wax. Paraffin waxes are defined herein as having a Brookfield viscosity in the range of about 50 to about 300 cps @ 140° C.; a melting point in the range of about 40° C. to about 80° C.; and a density in the range of about 0.85 g/cm$^3$ to about 0.95 g/cm$^3$. Exemplary paraffin waxes include waxes commercially available from Hoechst AG, such as Hoechst XL-165FR, Hoechst XL-165SB, Hoechst XL-165: and the like. Polyethylene waxes are defined herein as having Brookfield viscosity in the range of about 130 to about 450 cps @ 140° C.: a melting point in the range of about 80° C. to about 100° C.; and a density in the range of about 0.85 H g/cm$^3$ to about 0.95 g/cm$^3$. Exemplary polyethylene waxes include waxes commercially available from Allied Chemical Co. such as Allied 617A and 6A; and the like.

Paraffin and polyethylene waxes suitable for food contact purposes are known and commercially available, as previously described. Their properties and synthesis are described in 24 Kirk-Othmer Ency. Chem. Tech. - 3rd Ed., *Waxes*, at 473-77 (J. Wiley & Sons 1980), which is incorporated herein by reference.

The formulated barrier composition may contain additional additives well-known to those skilled in the art. Exemplary of additives which may be incorporated in the formulation are light stabilizers and antioxidants such as hindered phenol derivatives, pigments such as titanium dioxide and the like. Each of these additives is known and several types of each are commercially available.

The formulated barrier composition may be fabricated into any suitable final product, e.g., a variety of films or other articles. As is well-known in the art, the films and articles are fabricated with conventional extrusion and coextrusion: e.g, feedblock coextrusion, multimanifold die coextrusion, or combinations of the two: injection molding; extrusion molding; casting; blowing; blow molding; calendering; and lamination techniques. Such extrusion typically is carried out using a single or multiple screw extruder, most often a single screw extruder specially constructed for use with thermally sensitive copolymers such as vinylidene chloride copolymer. Such extrusion is familiar to persons of ordinary skill in the art. It is described in a number of patents and other general references, such as R. A. Wessling, *Polyvinlyidene Chloride.* supra, at 176-80; in 23 Ency. Poly Sci, supra. at 788-90; and in Ma et al., *Plastic Films*, Report No. 159 of SRI International Process Economics Program 179-210 (February 1986); all of which are incorporated herein by reference.

In using conventional processing equipment for thermally sensitive polymers, three conditions should be met. Two conditions, which are interrelated, are processing time and processing temperature. In melt processing polymers, it is generally recognized that as processing temperatures increase, processing times must decrease in order to avoid undesirable results such as polymer degradation. Melt processing must be accomplished at a temperature below that at which decomposition of the vinylidene chloride copolymer becomes significant. A third condition is that sufficient mixing must be generated during melt processing to provide a visually homogeneous blend, i.e., no visible solids, within a reasonable mixing time. The most appropriate residence time and temperature conditions vary with different equipment. Persons of ordinary skill in the art can ascertain the optimum conditions for their own equipment without undue experimentation.

Articles formed therefrom include blown and cast, mono and multi-layer, films; rigid and flexible containers: rigid and foam sheet: tubes; pipes; rods; fibers: and various profiles. Lamination techniques are particularly suited to produce multi-ply sheets. As is known in the art, specific laminating techniques include fusion: i.e., whereby self-sustaining lamina are bonded together by applications of heat and pressure; wet combining, i.e., whereby two or more plies are laminated using a tie coat adhesive, which is applied wet, the liquid driven off, and combining by subsequent pressure laminating in one continuous process; or by heat reactivation, i.e., combining a precoated film with another film by heating, and reactivating the precoat adhesive so that it becomes receptive to bonding after subsequent pressure laminating.

Exemplary articles include rigid containers used for the preservation of food, drink, medicine and other perishables. Such containers should have good mechanical properties, as well as low gas permeabilities to, for example, oxygen, carbon dioxide, water vapor, odor bodies or flavor bodies, hydrocarbons or agricultural chemicals. Most organic polymers such as the polyolefins, styrene polymers and the like, by themselves do not possess sufficient resistance to transmission of atmospheric gases and vapors. Consequently, multi-layer sheet structures employed in packaging materials have organic polymer skin layers laminated on each side of a vinylidene chloride copolymer barrier layer, generally with glue layers used to promote adhesion between the barrier layer and dissimilar material layers.

The barrier provided by formulated barrier compositions of the present invention varies depending upon the particular ratio of ingredients, the proportion of vinylidene chloride in the vinylidene chloride copolymer, and the structure (rigid container or flexible film, etc.) into which the formulated barrier product is fabricated. However, for containers using copolymers of vinylidene chloride and about 6 weight percent methyl acrylate, the rate of transmission for oxygen is on average preferably at most about 0.05 D.U., more preferably at most about 0.045 D.U., and most preferably at most about 0.04 D.U, both before and after retort, as measured on an Oxtran TM 10/50 oxygen permeability instrument produced by Modern Controls Inc. Formulated barrier compositions of the present invention can be extruded under most preferred conditions for up to 24 hours, preferably 48 hours, without noticeable build up of carbonaceous material on the extrusion screw and with very few occurrences of carbonaceous material in the extruded sheet. Furthermore, the formulated barrier compositions have superior interlayer stability in coextruded products.

ILLUSTRATIVE EXAMPLES

The present invention is illustrated in further detail by the following examples. The examples are for the purposes of illustration only, and are not to be construed as limiting the scope of the present invention. All parts and percentages are by weight unless otherwise specifically noted.

The compounds shown in Table I are chosen for this Example:

TABLE I
POLYMER COMPONENTS

| | |
|---|---|
| PVDC | A vinylidene chloride copolymer is formed through a suspension polymerization process. |

TABLE I-continued
POLYMER COMPONENTS

| | |
|---|---|
| | The vinylidene chloride copolymer is formed from a monomer mixture comprising about 94 weight percent vinylidene chloride and about 6 weight percent methyl acrylate, based on total monomer mixture weight. The copolymer has a average molecular weight of 90,000 and a major melting point 165° C. The copolymer contains a small amount of epoxidized soybean oil (ESO). |
| TSPP | A tetrasodium pyrophosphate which is commercially available from Monsanto and is designated as food grade. The TSPP is micronized until it passes through a 200 mesh screen. |
| HDPE | A high density polyethylene commercially available from The Dow Chemical Company under the trade designation HD 65053N. The high density polyethylene resin has a density (ASTM Test D-1505) of 0.953 grams per cubic centimeter and a melt index (ASTM Test D-1238) of 65 grams per 10 minutes. The HDPE is ground to a powder. |
| ESO | An epoxidized soybean oil commercially available from Viking Chemical Co. under the trade designation Vikoflex 7177. The epoxidized soybean oil has a viscosity of 3.1–3.8 Stokes @ 25° C. |
| OPE | An oxidized polyethylene commercially available under the trade designation as Allied 629A from Allied Corp. The oxidized polyethylene has a density (ASTM Test D-1505) of 0.93 grams per cubic centimeter @ 20° C., a drop point of 104° C., and a Brookfield Viscosity of 200 cps @ 140° C. |
| Wax | A polyethylene wax commercially available from Allied Corp. under the trade designation Allied 617A. The polyethylene wax has a density (ASTM Test D-1505) of 0.91 grams per cubic centimeter, a drop point of 102° C., and a Brookfield Viscosity of 180 cps @ 140° C. | ing those ingredients with the PVDC copolymer in 200-lb batches in a Littleford mixer for a period of about 6 to 15 minutes each, until a generally homogeneous mixture is obtained. The ratios shown are final weight concentrations in units of parts per hundred (resin). The amount of ESO actually added is slightly less than that shown, so that the added ESO and that already in the resin total up to the amount shown.

TABLE II

| Additive | Ex. A | Ex. B |
|---|---|---|
| TSPP | 0.8 | 0.8 |
| HDPE | 1.0 | 0.5 |
| ESO | 0.9 | 0.9 |
| OPE | 0.2 | 0.1 |
| WAX | 0.5 | 0.23 |

The two formulated resins are coextruded on conventional equipment to form a coextruded sheet containing 42.5 percent of polypropylene (first layer): 2.5 percent ESCOR TM 5610 tie layer (available from Exxon Corp.) (second layer): 10 percent formulated barrier composition (third layer); 2.5 percent ESCOR TM 5610 tie layer (fourth layer); and 42.5 percent of polypropylene (fifth layer). The sheet is formed into uniform containers by melt phase forming. Some containers are subjected to simulated retort by immersing in boiling water under heightened pressure at 250° F. for a period of one hour.

The oxygen permeability of the nonretorted and retorted samples is measured using an Oxtran TM 10/50 oxygen permeability instrument produced by Modern Controls Inc. with a nitrogen carrier gas at a temperature of about 23° C. Example A has an average oxygen permeability of 0.038 D.U. for the retorted sample and 0.036 D.U. for the nonretorted sample. Example B has an average oxygen permeability of 0.035 D.U. for the retorted sample and 0.050 D.U. for the nonretorted sample.

The formulated barrier composition from Example A is extruded at a rate of 79–82 lb per hour on an Egan ™ 2½ extruder having a 21-1 length-to-diameter ratio and a screw specifically designed for the extrusion of vinylidene chloride copolymers. (The screw design is currently in commercial use among converters of vinylidene chloride resins, and is commercially available from The Dow Chemical Company upon request). Carbonaceous material contamination in the extruded sheet is determined by counting specks of carbonaceous material over a one-minute period every 30 minutes during the 6-hour extrusion trial. The extruded product shows an average of about 3.75 carbonaceous material specks per minute. Inspection of the screw heel after the extrusion is completed shows no accumulation of carbonaceous material.

What is claimed is:

1. A formulated barrier composition in powder form comprising:
   1. a copolymer of vinylidene chloride and a comonomer chosen from the group consisting of:
      (a) 10 to 20 weight percent vinyl chloride;
      (b) 4 to 10 weight percent alkyl acrylate; or
      (c) a mixture of those comonomers: and
   2. a mixture of additives having the following weight concentration per hundred parts of vinylidene chloride copolymer:
      (a) an amount of inorganic stabilizer no greater than about 1.1 parts which is effective to stabilize the formulated barrier composition;
      (b) 0.45 to 1.05 part high density polyethylene;
      (c) 0.8 to 1.0 part epoxidized vegetable oil;
      (d) 0.05 to 0.25 part oxidized polyolefin; and
      (e) 0.20 to 0.55 part polyethylene or paraffin wax.

2. The composition of claim 1 wherein the vinylidene chloride copolymer is a copolymer of vinylidene chloride and 4 to 8 weight percent alkyl acrylate.

3. The composition of claim 2 wherein the vinylidene chloride copolymer is a copolymer of vinylidene chloride and 4 to 8 weight percent methyl acrylate.

4. The composition of claim 3 wherein the inorganic stabilizer consists essentially of 0.7 to 0.9 part per hundred (resin) tetrasodium pyrophosphate.

5. The composition of claim 4 wherein the inorganic stabilizer consists essentially of about 0.8 part per hundred (resin) tetrasodium pyrophosphate.

6. The composition of claim 4 wherein the mixture of additives comprises from about 0.5 part per hundred (resin) to about 1.0 part high density polyethylene.

7. The composition of claim 4 wherein the mixture of additives comprises from about 0.9 part per hundred (resin) to about 1.0 part high density polyethylene.

8. The composition of claim 7 wherein the mixture of additives comprises about 0.9 part per hundred (resin) epoxidized vegetable oil.

9. The composition of claim 8 wherein the epoxidized vegetable oil is epoxidized soybean oil.

10. The composition of claim 4 wherein the mixture of additives comprises from about 0.1 part per hundred (resin) to about 0.2 part per hundred (resin) oxidized polyolefin.

11. The composition of claim 10 wherein the oxidized polyolefin is oxidized polyethylene.

12. The composition of claim 4 wherein the mixture of additives comprises from about 0.23 part per hundred (resin) to about 0.5 part per hundred (resin) polyethylene or paraffin wax.

13. The composition of claim 12 wherein the polyethylene or paraffin wax is a polyethylene wax.

14. The composition of claim 4 wherein the mixture of additives comprises about:
    (a) 0.8 part per hundred (resin) tetrasodium pyrophosphate:
    (b) 0.5 to 1.0 part per hundred (resin) high density polyethylene;
    (c) 0.9 part per hundred (resin) epoxidized soybean oil;
    (d) 0.1 to 0.2 part per hundred (resin) oxidized polyethylene; and
    (e) 0.23 to 0.5 part per hundred (resin) polyethylene wax.

15. The composition of claim 14 wherein the vinylidene chloride copolymer is a copolymer with about 6 weight percent methyl acrylate, and wherein the extruded product of the composition has an average oxygen permeability of at most about 0.05 D.U. in containers.

16. The composition of claim 15 wherein the mixture of additives comprises about:
    (a) 0.8 part per hundred (resin) tetrasodium pyrophosphate;
    (b) 1.0 part per hundred (resin) high density polyethylene;
    (c) 0.9 part per hundred (resin) epoxidized soybean oil;
    (d) 0.2 part per hundred (resin) oxidized polyethylene; and
    (e) 0.5 part per hundred (resin) polyethylene wax.

17. The composition of claim 15 wherein the mixture of additives comprises about:
    (a) 0.8 part per hundred (resin) tetrasodium pyrophosphate:
    (b) 0.5 part per hundred (resin) high density polyethylene;
    (c) 0.9 part per hundred (resin) epoxidized soybean oil:
    (d) 0.1 part per hundred (resin) oxidized polyethylene; and
    (e) 0.23 part per hundred (resin) polyethylene wax.

18. The composition of claim 3 wherein the inorganic stabilizer consists essentially of about 0.6 to 0.7 part per hundred (resin) magnesium hydroxide.

19. The composition of claim 18 wherein the inorganic stabilizer consists essentially of about 0.65 part per hundred (resin) magnesium hydroxide.

20. The composition of claim 18 wherein the mixture of additives comprises from about 0.5 part per hundred (resin) to about 1.0 part high density polyethylene.

21. The composition of claim 18 wherein the mixture of additives comprises from about 0.9 part per hundred (resin) to about 1.0 part high density polyethylene.

22. The composition of claim 18 wherein the mixture of additives comprises about 0.9 part per hundred (resin) epoxidized vegetable oil.

23. The composition of claim 22 wherein the epoxidized vegetable oil is epoxidized soybean oil.

24. The composition of claim 18 wherein the mixture of additives comprises from about 0.1 part per hundred (resin) to about 0.2 part per hundred (resin) oxidized polyolefin.

25. The composition of claim 24 wherein the oxidized polyolefin is oxidized polyethylene.

26. The composition of claim 18 wherein the mixture of additives comprises from about 0.23 part per hundred (resin) to about 0.5 part per hundred (resin) polyethylene or paraffin wax.

27. The composition of claim 26 wherein the polyethylene or paraffin wax is a polyethylene wax.

28. The composition of claim 18 wherein the mixture of additives comprises about:
   (a) 0.65 part per hundred (resin) magnesium hydroxide;
   (b) 0.5 to 1.0 part per hundred (resin) high density polyethylene;
   (c) 0.9 part per hundred (resin) epoxidized vegetable oil;
   (d) 0.1 to 0.2 part per hundred (resin) oxidized polyethylene; and
   (e) 0.23 to 0.5 part per hundred (resin) polyethylene wax.

29. The composition of claim 28 wherein the vinylidene chloride copolymer is a copolymer with about 6 weight percent methyl acrylate, and the extruded or coextruded product of the composition has an oxygen permeability of no more than about 0.05 D.U. in containers.

30. The composition of claim 1 wherein the vinylidene chloride copolymer is a copolymer of vinylidene chloride and vinyl chloride.

31. The composition of claim 30 wherein the inorganic stabilizer consists essentially of 0.7 to 0.9 part per hundred (resin) tetrasodium pyrophosphate.

32. The composition of claim 30 wherein the inorganic stabilizer consists essentially of about 0.8 part per hundred (resin) tetrasodium pyrophosphate.

33. The composition of claim 30 wherein the mixture of additives comprises from about 0.5 part per hundred (resin) to about 1.0 part high density polyethylene.

34. The composition of claim 30 wherein the mixture of additives comprises about 0.9 part per hundred (resin) epoxidized soybean oil.

35. The composition of claim 30 wherein the mixture of additives comprises from about 0.1 part per hundred (resin) to about 0.2 part per hundred (resin) oxidized polyethylene.

36. The composition of claim 30 wherein the mixture of additives comprises from about 0.23 part per hundred (resin) to about 0.5 part per hundred (resin) polyethylene wax.

37. The composition of claim 30 wherein the mixture of additives comprises about:
   (a) 0.8 part per hundred (resin) tetrasodium pyrophosphate:
   (b) 0.5 to 1.0 part per hundred (resin) high density polyethylene:
   (c) 0.9 part per hundred (resin) epoxidized vegetable oil:
   (d) 0.1 to 0.2 part per hundred (resin) oxidized polyethylene; and
   (e) 0.23 to 0.5 part per hundred (resin) polyethylene wax.

38. The composition of claim 30 wherein the inorganic stabilizer consists of about 0.6 to 0.7 part per hundred (resin) magnesium hydroxide.

39. The composition of claim 38 wherein the inorganic stabilizer consists essentially of about 0.65 part per hundred (resin) magnesium hydroxide.

40. The composition of claim 38 wherein the mixture of additives comprises from about 0.5 part per hundred (resin) to about 1.0 part per hundred (resin) high density polyethylene.

41. The composition of claim 38 wherein the mixture of additives comprises about 0.9 part per hundred (resin) epoxidized soybean oil.

42. The composition of claim 38 wherein the mixture of additives comprises from about 0.1 part per hundred (resin) to about 0.2 part per hundred (resin) oxidized polyethylene.

43. The composition of claim 38 wherein the mixture of additives comprises from about 0.23 part per hundred (resin) to about 0.5 part per hundred (resin) polyethylene wax.

44. The composition of claim 38 wherein the mixture of additives comprises about:
   (a) 0.65 part per hundred (resin) magnesium hydroxide;
   (b) 0.5 to 1.0 part per hundred (resin) high density polyethylene;
   (c) 0.9 part per hundred (resin) epoxidized vegetable oil:
   (d) 0.1 to 0.2 part per hundred (resin) oxidized polyethylene; and
   (e) 0.23 to 0.5 part per hundred (resin) polyethylene wax.

45. A multi-layer article containing a barrier layer which comprises the product of a formulated barrier composition of claim 1.

46. A multi-layer article containing a barrier layer which comprises the product of a formulated barrier composition of claim 15.

47. A multi-layer article containing a barrier layer which comprises the product of a formulated barrier composition of claim 29.

48. A multi-layer article containing a barrier layer which comprises the product of a formulated barrier composition of claim 37.

49. A multi-layer article containing a barrier layer which comprises the product of a formulated barrier composition of claim 44.

50. An additive composition comprising, in the following weight ratios:
   (a) an amount of inorganic stabilizer no greater than about 1.1 parts which is effective to stabilize a formulated barrier composition containing primarily vinylidene chloride-containing copolymer;
   (b) 0.45 to 1.05 parts high density polyethylene;
   (c) up to 1.0 part epoxidized vegetable oil, chosen such that the total concentration when added to a vinylidene chloride copolymer containing one of those compounds will be 0.8 to 1.0 part per hundred (resin) epoxidized vegetable oil;
   (d) 0.05 to 0.25 part oxidized polyethylene; and
   (e) 0.2 to 0.55 part paraffin or polyethylene wax.

51. The additive composition of claim 50 wherein the inorganic stabilizer is chosen from the group consisting of tetrasodium pyrophosphate and magnesium hydroxide.

52. The additive composition of claim 50 wherein the inorganic stabilizer consists essentially of tetrasodium pyrophosphate in a concentration of between about 0.7 to 0.9 parts.

53. The additive composition of claim 50 wherein the inorganic stabilizer consists essentially of magnesium hydroxide in a concentration of between about 0.6 and 0.7 parts.

54. The additive composition of claim 50 wherein the composition comprises from about 0.05 parts to about 1.0 part high density polyethylene.

55. The additive composition of claim 50 wherein the epoxidized vegetable oil is epoxidized soybean oil.

56. The additive composition of claim 50 wherein the mixture of additives comprises from about 0.1 part to about 0.2 parts oxidized polyolefin.

57. The additive composition of claim 50 wherein the oxidized polyolefin is oxidized polyethylene.

58. The composition of claim 50 wherein the mixture of additives comprises from about 0.23 parts to about 0.5 parts polyethylene or paraffin wax.

59. The additive composition of claim 50 wherein the polyethylene or paraffin wax is a polyethylene wax.

60. The additive composition of claim 50 wherein the additive composition comprises about:
  (a) 0.8 parts tetrasodium pyrophosphate or 0.6 to 0.7 parts magnesium hydroxide;
  (b) 0.5 to 1.0 parts high density polyethylene;
  (c) 0.9 parts epoxidized soybean oil;
  (d) 0.1 to 0.2 parts oxidized polyethylene; and
  (e) 0.23 to 0.5 parts polyethylene wax.

61. The additive composition of claim 50 wherein the additive composition comprises about:
  (a) 0.8 parts tetrasodium pyrophosphate;
  (b) 0.5 parts high density polyethylene;
  (c) 0.9 parts epoxidized soybean oil;
  (d) 0.1 parts oxidized polyethylene; and
  (e) 0.23 parts polyethylene wax.

* * * * *

UNITED STATES PATENT AND TRADEMARK OFFICE
CERTIFICATE OF CORRECTION

PATENT NO. : 5,002,989

DATED : March 26, 1991

INVENTOR(S) : John A. Naumovitz, Steven R. Jenkins, Mark J. Hall, and Stephen R. Betso It is certified that error appears in the above-identified patent and that said Letters Patent is hereby corrected as shown below:

Column 9, Claim 1, line 26, " vinyl chloride: " should be correctly punctuated -- vinyl chloride; --.

Column 9, Claim 1, line 28, " those comonomers: and " should be correctly punctuated -- those comonomers; and --.

Column 10, Claim 14, line 10, " phosphate: " should be correctly punctuated -- phosphate; --.

Column 10, Claim 14, line 14, " oil: " should be correctly punctuated -- oil; --.

Column 10, Claim 16, line 30, " ylene: " should correctly be punctuated -- ylene; --.

Column 10, Claim 16, line 34, " ene: and " should be correctly be punctuated -- ene; and --.

Column 10, Claim 17, line 39, " phosphate: " should correctly be punctuated -- phosphate; --.

Column 10, Claim 17, line 43, " oil: " should correctly be punctuated -- oil; --.

Column 10, Claim 17, line 45, " ene: and " should correctly be punctuated -- ene; and --.

Column 11, Claim 37, line 54, " phosphate: " should correctly be punctuated -- phosphate; --.

UNITED STATES PATENT AND TRADEMARK OFFICE
CERTIFICATE OF CORRECTION

PATENT NO. : 5,002,989

DATED : March 26, 1991

INVENTOR(S) : John A. Naumovitz, Steven R. Jenkins, Mark J. Hall, and Stephen R. Betso It is certified that error appears in the above-identified patent and that said Letters Patent is hereby corrected as shown below:

Column 11, Claim 37, line 56, " polyethylene: " should be correctly punctuated -- polyethylene; --.

Column 11, Claim 37, line 58, " oil: " should be correctly punctuated -- oil; --.

Column 11, Claim 38, line 64, " consists of about " should correctly read -- consists essentially of about --.

Column 12, Claim 44, line 23, " oil: " should be correctly punctuated -- oil; --.

Column 13, Claim 54, line 2, " 0.05 " should correctly read -- 0.5 --.

Signed and Sealed this

Ninth Day of March, 1993

*Attest:*

STEPHEN G. KUNIN

*Attesting Officer*      *Acting Commissioner of Patents and Trademarks*